(12) United States Patent
Oder

(10) Patent No.: US 8,170,423 B2
(45) Date of Patent: May 1, 2012

(54) DATA TRANSMISSION OPTICAL DEVICE COMPRISING A SOURCE EMITTING A LASER BEAM

(75) Inventor: Engin Oder, Tournefeuille (FR)

(73) Assignee: Thales (FR)

( * ) Notice: Subject to any disclaimer, the term of this patent is extended or adjusted under 35 U.S.C. 154(b) by 875 days.

(21) Appl. No.: 12/100,449

(22) Filed: Apr. 10, 2008

(65) Prior Publication Data
US 2009/0097378 A1    Apr. 16, 2009

(30) Foreign Application Priority Data
Apr. 10, 2007 (FR) ...................................... 07 02601

(51) Int. Cl.
*H04B 10/04* (2006.01)

(52) U.S. Cl. ...................................................... 398/201

(58) Field of Classification Search .................. 398/127, 398/129, 131, 201
See application file for complete search history.

(56) References Cited

U.S. PATENT DOCUMENTS

| 4,214,807 | A | * | 7/1980 | Gfeller et al. ...................... 359/7 |
| 5,777,768 | A | * | 7/1998 | Korevaar ....................... 398/129 |
| 5,986,787 | A |   | 11/1999 | Ohshima et al. |
| 6,243,182 | B1 | * | 6/2001 | Wang .............................. 398/119 |
| 6,972,904 | B2 | * | 12/2005 | Bratt et al. ..................... 359/558 |
| 7,409,161 | B2 | * | 8/2008 | Watanabe ....................... 398/130 |
| 2002/0131121 | A1 | * | 9/2002 | Jeganathan et al. ........... 359/152 |
| 2004/0213587 | A1 |   | 10/2004 | Conchas et al. |
| 2007/0031150 | A1 | * | 2/2007 | Fisher et al. .................. 398/128 |
| 2008/0219671 | A1 | * | 9/2008 | Schmitt ......................... 398/130 |

FOREIGN PATENT DOCUMENTS
DE       10107538    10/2002
WO    WO 2006/032221    3/2006
\* cited by examiner

*Primary Examiner* — Leslie Pascal
(74) *Attorney, Agent, or Firm* — Lowe Hauptman Ham & Berner, LLP

(57) ABSTRACT

The present invention relates to a data transmission optical device including a source emitting a laser beam for transmitting the data toward an optical sensor. The device has means for collimating the beam. It may be implemented on board an aircraft for transmitting audio or video data to the passenger seats. The device has applications for on-demand video.

9 Claims, 7 Drawing Sheets

DATA TRANSMISSION OPTICAL DEVICE COMPRISING A SOURCE EMITTING A LASER BEAM

RELATED APPLICATIONS

The present application is based on, and claims priority from, French Application Number 07 02601, filed Apr. 10, 2007, the disclosure of which is hereby incorporated by reference herein in its entirety.

FIELD OF THE INVENTION

The present invention relates to a data transmission optical device comprising a source emitting a laser beam for transmitting the data toward an optical sensor. It applies, for example, to the field of on-demand video on board aircraft.

BACKGROUND OF THE INVENTION

The appearance of new equipment on board airplanes, such as IFE (In Flight Entertainment) systems allowing, for example, distribution of on-demand video to passengers, has led to a constant increase in cabling in the passenger cabins of airplanes. This not only poses weight problems, but also installation and maintenance cost problems, in addition to problems of configurability of the passenger cabin.

Solutions using wireless communication technologies via radiowaves, such as connections conforming to the standard IEEE802.11, better known by the commercial name "wi-fi connection", are currently in the process of being researched and tested. Other solutions using wireless communication technologies via light waves, such as the IrDA protocol, the acronym meaning "Infrared Data Association", are also in the process of being researched and tested. Unfortunately, for diverse reasons, these current solutions have only led to a moderately significant reduction in the quantity of cabling. This is because a line of cables, better known by the name "backbone", still passes longitudinally through the passenger cabin for carrying the signals from the server to the immediate proximity of the seats. Only the last part is realized by a wireless wi-fi or IrDA connection. Often the backbone is situated in the ceiling of the passenger cabin. It should be noted, however, that these solutions based on wi-fi or IrDA technology partly solve the problem of configurability of the passenger cabin for which they were designed. Indeed, the first IFE systems, which used a wired connection through to the seats, meant that the arrangement of the seats could hardly be adjusted. This is no longer the case with solutions combining a wired backbone with a wi-fi connection or combining a wired backbone with an IrDA connection, as the seat is no longer connected by a wire to the IFE system. But these solutions only ease the problem of weight and of additional cost linked with the use of cables: it is still necessary to have a cabled backbone in the ceiling of the passenger cabin. And in addition they do not solve the possible problems of electromagnetic interference in the wi-fi band.

The present invention proposes notably replacing the cabled backbone with a wireless backbone, this being done by exploiting free-air infrared laser beam communication technology. This is because an infrared laser beam is capable of carrying information at high speed without data compression, whether this is on an optical medium such as glass fiber or simply by allowing the light beam to propagate freely in the air. For example, this technology is a practical and economical solution for establishing a point-to-point connection covering the "last mile" in long-haul networks. But it is also used from the roof of buildings in urban local networks. This technology has the decisive advantage that, in contrast to radio communications, the use of an optical laser is not subject to any license being obtained. It also has great flexibility of use in terms of installation and deinstallation: it does not require any heavy infrastructure requiring civil engineering works. But implementing such a technology on board an airplane is not without many difficulties.

This poses, among others, a problem of sighting. Indeed, it is imperative to establish and to maintain precise alignment between the elements of the connection so that the beam connects these elements properly to each other. The mechanical constraints to which an airplane is subjected, notably the deformations and vibrations, make it difficult to maintain such a sighting. The connection is therefore frequently interrupted, occasioning significant information losses which even high-performance communication protocols fail to correct.

Moreover, the use of a laser beam in a busy environment such as the passenger cabin of an airplane is not without danger. For even a low-power laser might represent a real danger to the eye by causing irreparable burns to the retina. This is furthermore why devices diffusing a laser beam are classed in six standard classes, which are Class I, Class II, Class IIa, Class IIIa, Class IIIb and Class IV lasers, each category notably representing a hazard level for the eyesight.

In addition, the problem for an IFE system, consisting in a server sending data to several clients, does not seem really to correspond to the problem for current point-to-point systems using laser transmission to send data from a server to a single client.

SUMMARY OF THE INVENTION

The aim of the invention is notably to overcome the aforementioned problems. To this end, the subject of the invention is a data transmission optical device comprising a source emitting a laser beam for transmitting the data toward an optical sensor. It comprises means for collimating the beam.

For example, to collimate the beam it may comprise a diverging lens and a parabolic mirror, or a diverging lens and a holographic mirror, or a diverging lens and a holographic lens.

Advantageously, the source may emit an infrared laser beam and the sensor may be a photoelectric cell. At least one mirror may guide the collimated beam by reflection from the source through to the optical sensor.

In an embodiment on board an aircraft, the source may be positioned at one end of the passenger cabin of the aircraft and the sensor may be associated with a seat, the transmitted data possibly being multimedia audio or video data.

The invention also has the main advantages of permitting data transfer rates of around 100 gigabits per second, which is much higher than other types of wireless connection. By way of comparison, wi-fi connections provide transfer rates of only around 40 to 56 megabits per second. Even MIMO technology, that is Multiple-Input Multiple-Output technology, which is a not-yet standardized development of the wi-fi connection, only provides transfer rates of around 100 megabits per second! Moreover, in an application such as on-demand video on board an airplane the total absence of cable allows considerable reduction not only in the cost price of the system, but also in its installation and maintenance costs. It also offers far greater flexibility if the system is uninstalled for reconfiguring the passenger cabin. It simplifies the development of aircraft cabling just as much when first fitted as in the case of installation on an airplane that was not initially provided with it.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE DRAWINGS

Figure 1A:
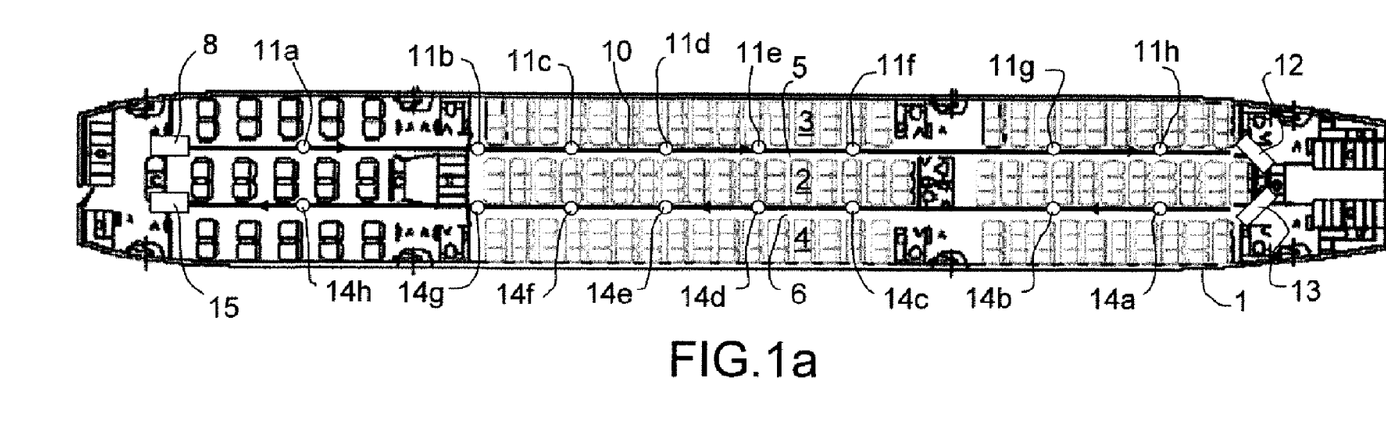
FIGS. 1a and 1b represent cross-sectional views illustrating an exemplary embodiment of an IFE system according to the invention.
Figure 1B:
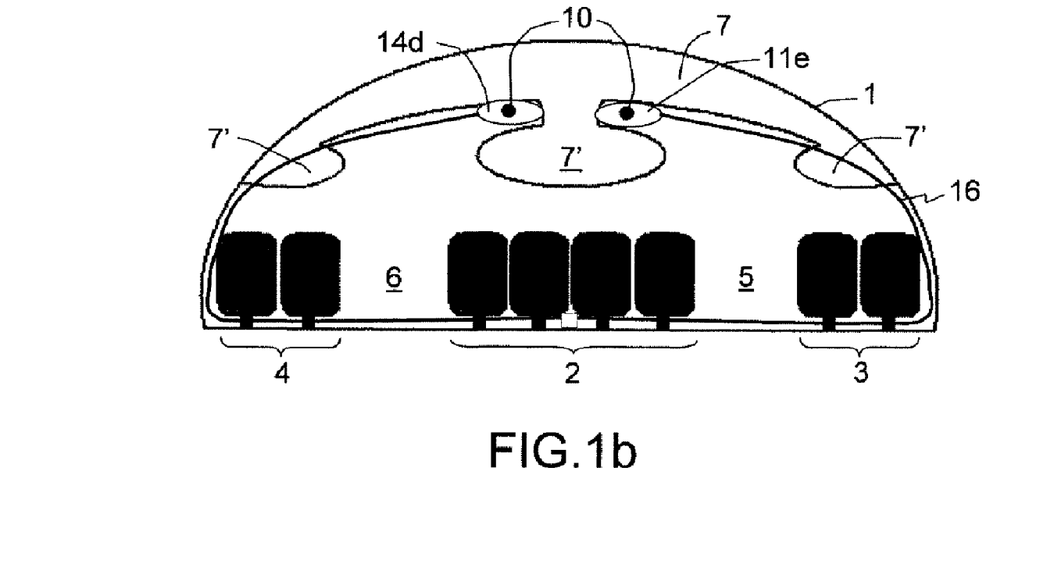

FIGS. 1a and 1b illustrate by cross-sectional views an exemplary embodiment of an IFE system according to the invention in a passenger cabin 1 of an airplane. FIG. 1a is a view of the passenger cabin 1 in longitudinal section. FIG. 1b is a view of the passenger cabin 1 in cross section. Seats are arranged in the passenger cabin 1 in a central row 2 and two side rows 3 and 4, forming two aisles 5 and 6. The passenger cabin 1 comprises a ceiling 7, which can be used notably to provide in its low parts storage compartments 7' for hand luggage. A laser source 8 is positioned at one end of the passenger cabin 1 above the aisle 5 so as to emit a laser beam 10 which passes along the aisle 5 to the other end of the passenger cabin 1, following a straight path at a height ensuring that it is difficult for a person using the aisle 5 to break the beam 10 inadvertently. To do this, it is advantageous to accommodate the beam 10 above the storage compartments 7' very close to the ceiling 7. In this way, it is almost impossible to break the beam 10 except by an intentional act. All along the aisle 5, the beam 10 successively passes eight optical devices 11a, 11b, 11c, 11d, 11e, 11f, 11g and 11h which receive part of the beam 10 without disturbing the other part, which continues its straight path along the aisle 5. These devices therefore have a dual optical function of reception and transmission. Such a device, combining these functions, is usually called a "transceiver". Consequently, such devices will be called transceivers. It should be noted that they retransmit the beam 10 in the same direction as the direction of reception. The transceivers 11a, 11b, 11c, 11d, 11e, 11f, 11g and 11h also have a gateway function for the information: they allow the information contained in that part of the beam they receive to be extracted. A first mirror 12, placed at the end opposite the source 8 in the aisle 5, reflects the beam 10 at approximately a right angle in the direction of the aisle 6 which it intersects perpendicularly. A second mirror 13, placed facing the mirror 12 in that aisle 6, again reflects the beam 10 at approximately a right angle so as to return it along the aisle 6 to the other end of the passenger cabin 1, still following a path ensuring that it is difficult for a person using the aisle 6 to break the beam 10 inadvertently. All along the aisle 6, the beam 10 successively passes eight transceivers 14a, 14b, 14c, 14d, 14e, 14f, 14g and 14h which receive part of the beam 10 without disturbing the other part which continues its straight path along the aisle 6. The transceivers 14a, 14b, 14c, 14d, 14e, 14f, 14g and 14h also have a dual optical function of reception and transmission of the beam, in addition to a gateway function for the information. A receiver 15, positioned at the end of the passenger cabin 1 in the aisle 6 facing the source 8, intercepts the residual part of the beam 10. The receiver 15 receives the part of the beam 10 that has not been intercepted by any of the 16 transceivers.

FIG. 1b illustrates in more detail the area of implementation of the transceivers 11e and 14d traversed by the beam 10, one part of which they receive and the other part of which they retransmit. For example, the transceiver 11e provides a local Ethernet connection 16 which goes down toward the seats situated on each side of the aisle 5, thus ensuring communication between the transceiver 11e and the four seats situated on both sides of the aisle 5 in two rows of two seats.

A main advantage of the transceivers according to the invention is that they allow the use of only a single source laser as they do not interrupt the beam 10 and allow it to continue its path toward the next transceiver.

Figure 2A:
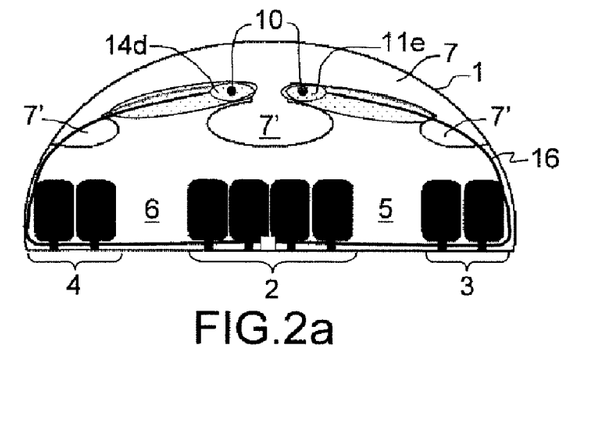
FIGS. 2a and 2b represent a cross-sectional view and a synoptic view of examples of transceivers according to the invention.
Figure 2B:
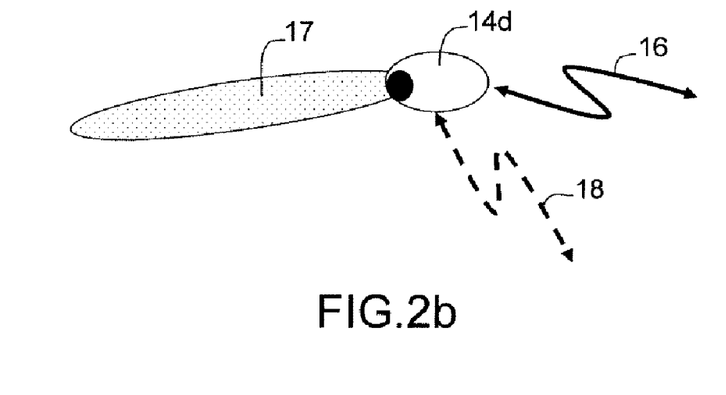

FIGS. 2a and 2b illustrate in more detail the transceivers 14d and 11e. FIG. 2a is a cross-sectional view of area of implementation of the transceivers 11e and 14d. FIG. 2b is a simplified synoptic view of the transceiver 14d. As already indicated previously, the transceivers also have a gateway function for the information: they allow the information contained in the part of the beam they receive to be extracted. Notably, they make this information available by means of diverse interfaces, of the type of the Ethernet connection 16 or of the type of an IrDA connection 18 or of the type of a laser beam 17.

Figure 3:
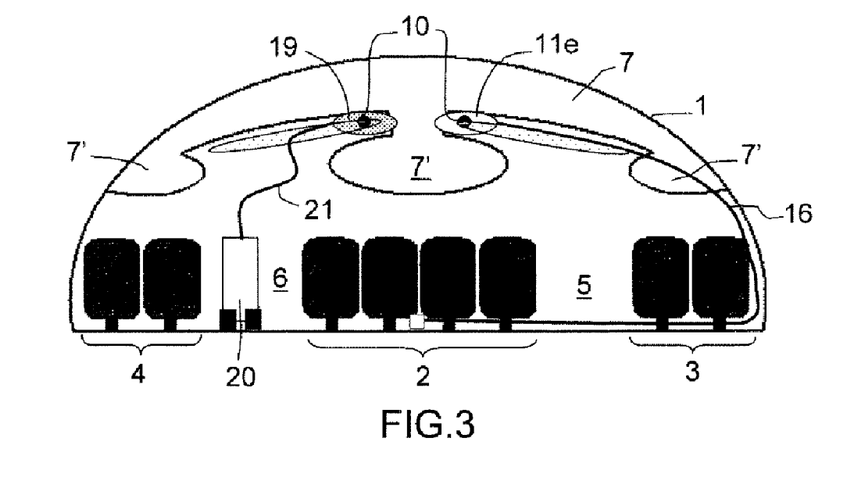
FIG. 3 represents a cross-sectional view illustrating an exemplary embodiment of transceivers according to the invention.

FIG. 3 illustrates the area of implementation of the transceivers 11e and 14d with a cross-sectional view. A mobile transceiver 19, which hides the transceiver 14d in the figure, may for example connect mobile equipment such as a trolley 20 for in-flight sales or medical assistance, this being by means of a wired connection 21. But the connection 21 may be replaced by a wireless connection. The mobile transceiver 19 is simply fixed to the ceiling 7 by an appropriate removable fixing device so as to intercept the beam 10. Indeed it is important to understand that the transceivers, whether installed permanently or temporarily in the path of the beam 10, play the role of a gateway which may be implemented via various communication protocols, this without departing from the principles set out by the present invention.

Figure 4:
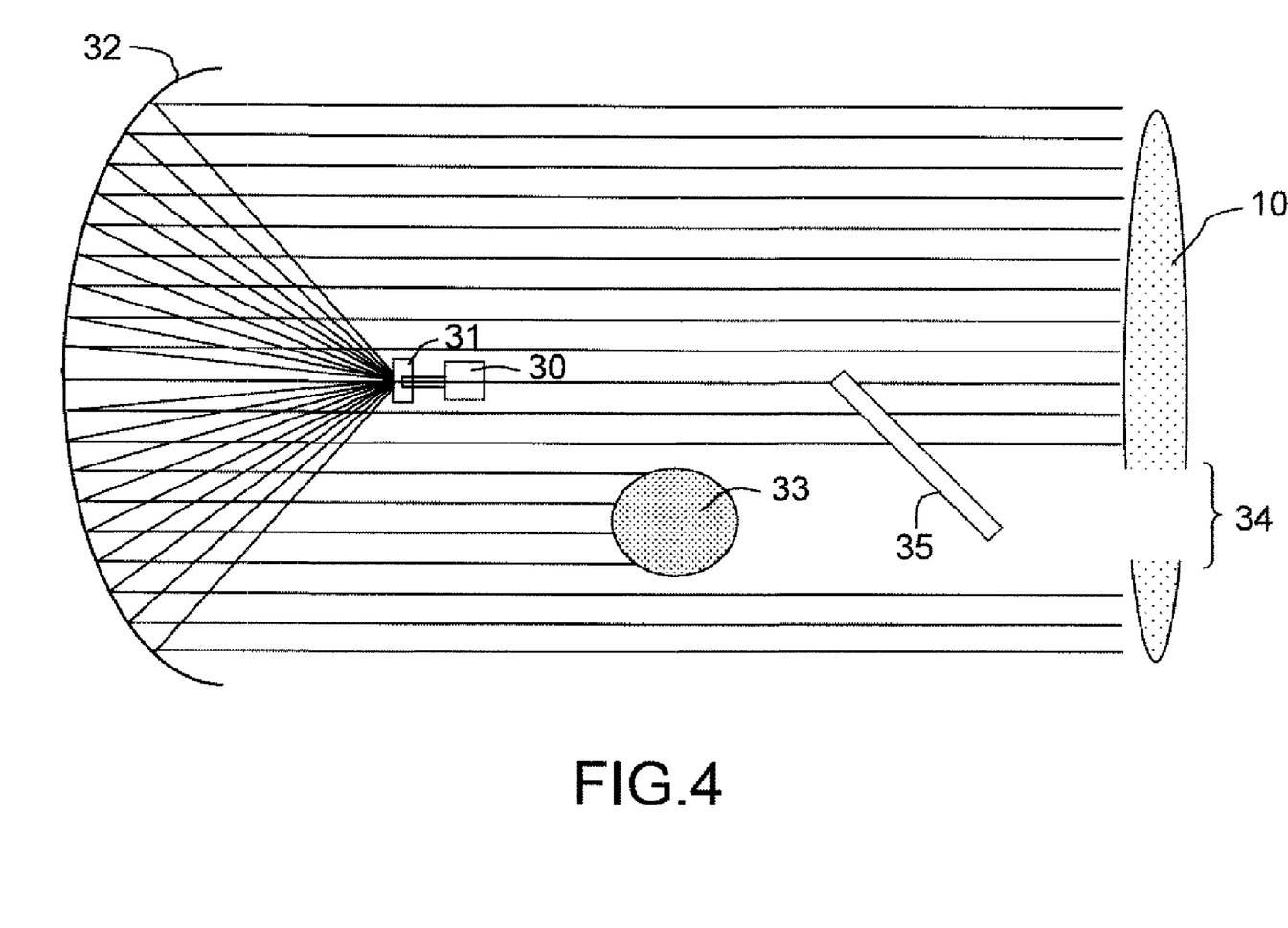
FIG. 4 represents a synoptic illustration of an exemplary embodiment a laser source according to the invention.

FIG. 4 illustrates with a synoptic view an exemplary embodiment a laser source 8. The laser source 8 comprises a laser diode 30 positioned behind a diverging lens 31. A parabolic mirror 32 is positioned in front of the lens 31. The diode 30 emits a narrow, nondiverging, spot laser beam which is first dispersed by the lens 31 in a horizontal, elliptically diverging plane, then collimated in a single direction by the mirror 32 to form the beam 10. In this way, the spot beam emitted by the diode 30 has been collimated to form the laser beam 10. The beam 10 is said to be collimated because it consists of parallel coherent light rays, these rays being specifically lying within a surface. The vertical section through this beam has the form of a flattened elliptical surface in the example of the figure. In other embodiments, the mirror 32 may be replaced by a holographic mirror or by a holographic lens. If it should happen, despite the precautions taken to avoid the beam 10 being inadvertently broken, that an obstacle 33 interrupts the beam 10, the mirror 32 is of sufficient width to ensure that in most cases the beam 10 is only partly broken. In this way, the beam 10 is only interrupted over an area 34 limited to the shadow of the object 33, which allows a sufficiently wide optical device 35 to remain partly illuminated by the beam 10, despite the presence of the obstacle 33 between it and the source 8. Such a device not only minimizes the risks of inopportune obstructions, but also reduces the spatial density of the light energy by spreading it over a larger area and thus minimizing the risks of eye damage and corrects possible misalignment of the beam.

Figure 5:
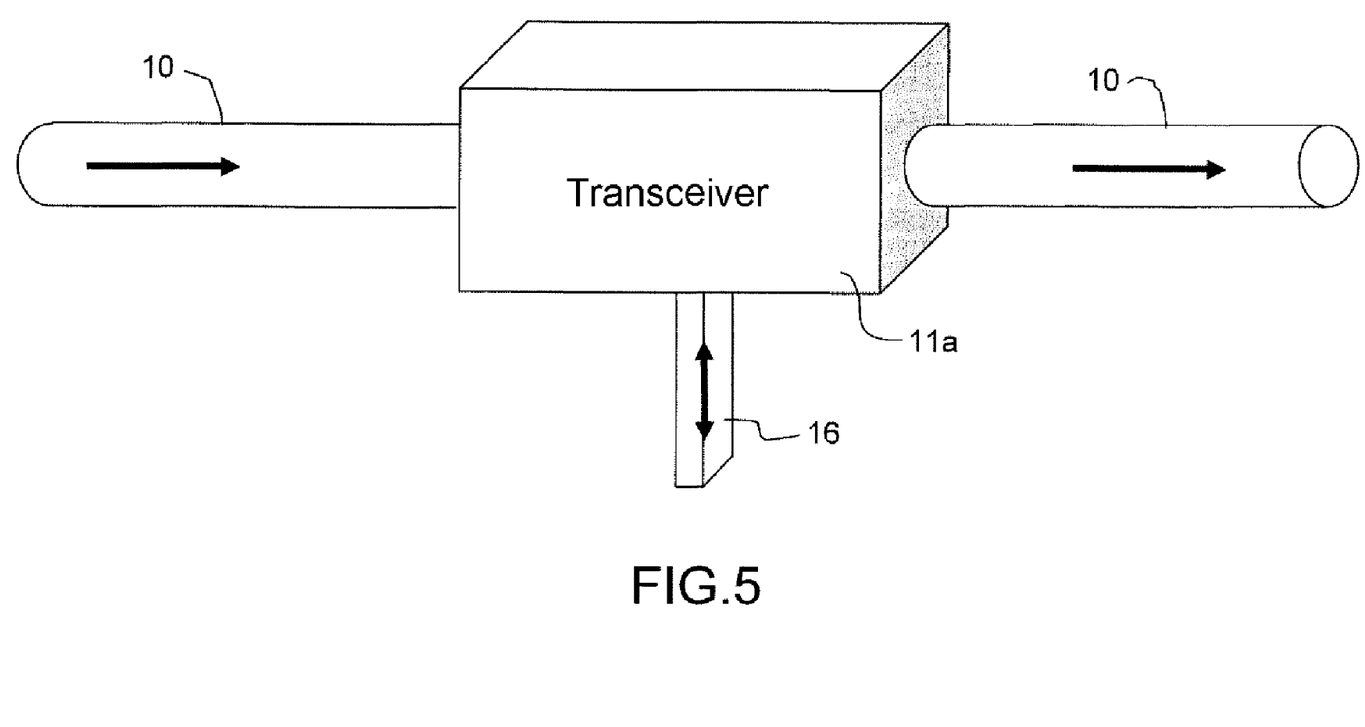
FIG. 5 represents a synoptic illustration of the triple function of the transceivers according to the invention.

FIG. 5 illustrates with a synoptic view the triple function of the transceivers 11a, 11b, 11c, 11d, 11e, 11f, 11g, 11h, 14a, 14b, 14c, 14d, 14e, 14f, 14g and 14h. The transceiver 11a, for example, first receives the beam 10: it plays the role of receiver. Then it allows the information contained in the beam 10 to be extracted and sends the beam toward the local Ethernet connection 16: it plays the role of a gateway for information contained in the beam 10. Finally, the transceiver 11a retransmits the beam 10 in the same direction as the direction of reception: it plays the role of re-emitting the beam 10. It should indeed be understood that any type of connection other than Ethernet may be used, for example an IrDA connection, without departing from the principles of the present invention.

Figure 6:
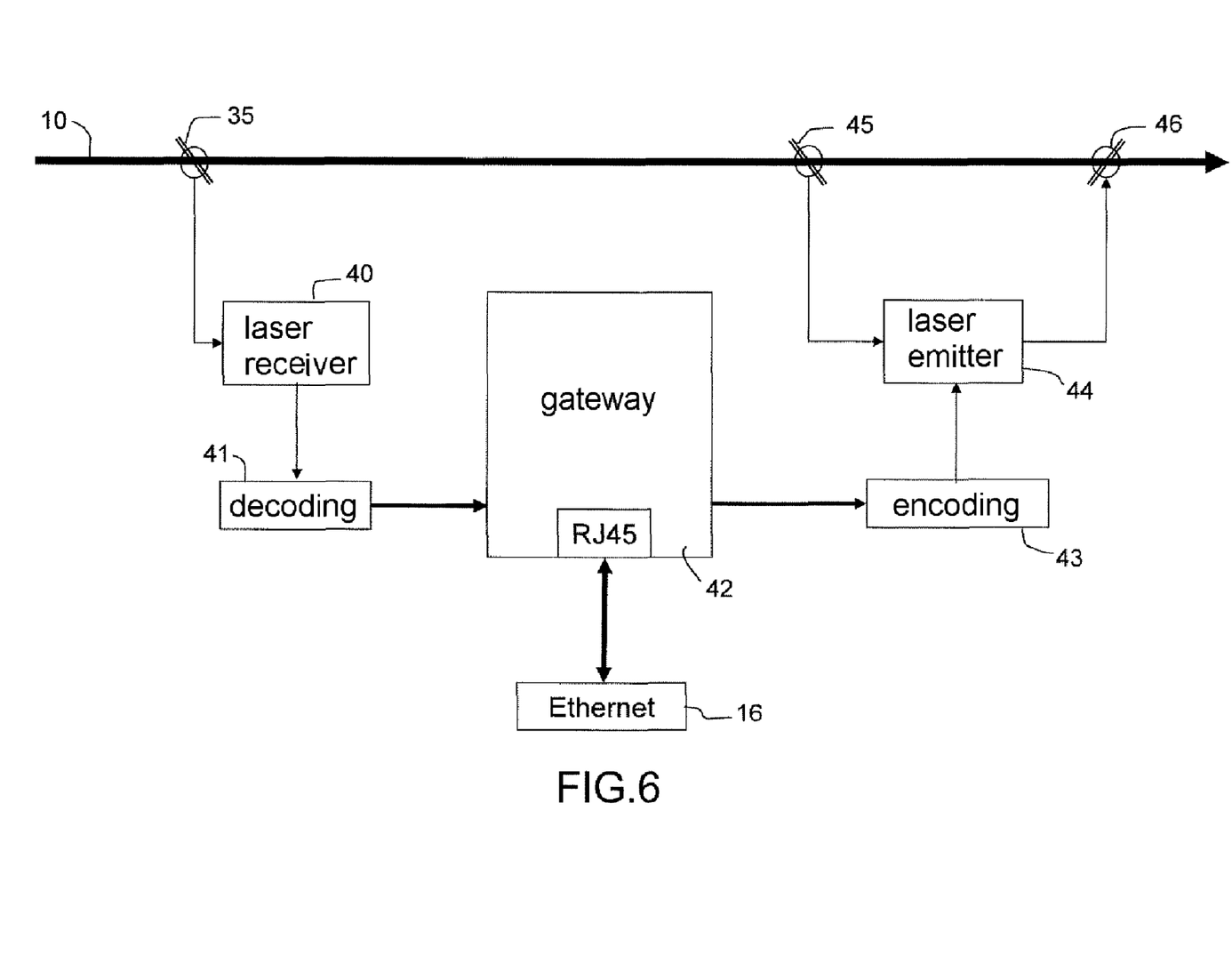
FIG. 6 represents a synoptic illustration of an exemplary embodiment a triple-function transceiver according to the invention.

FIG. 6 illustrates with a synoptic view an exemplary embodiment a triple-function transceiver according to the invention. It notably comprises the optical device 35 previously introduced, positioned in the path of the beam 10. For example, the optical device 35 may be a semireflecting mirror; it therefore does not interrupt the beam 10, but reflects a part of it toward the laser receiver 40 by a mechanism that will be illustrated in more detail subsequently. The receiver 40 converts the beam into an electrical signal. The electrical signal is transmitted to a decoding module 41 which converts the signal into a data stream. The data flows are transmitted to a gateway module 42 which makes the data available to a client that is not represented in FIG. 6. The example of FIG. 6 is an Ethernet client and making data available amounts to preparing the data for retransmission via the Ethernet connection 16: the module 42 encapsulates the data in packets to be sent to the Ethernet connection 16 via an RJ45 cable. Furthermore, data packets may also be received on the Ethernet connection 16 and processed by the gateway module 42, which transmits the data they contain to an encoding module 43. The module 43 converts the data into an electrical signal which it transmits to a laser modulator 44. An optical device 45, placed in the path of the beam 10 downstream of the device 35 and the similar thereto, notably allows parts of the beam 10 to be reflected toward the laser modular 44. The laser modulator adds to this the data corresponding to the signal it has received from the module 43. It retransmits the resultant beam by means of an optical device 46, this beam and the data that have been added to it being received by the transceivers downstream and by the previously introduced laser receiver 15. It should be noted that other architectures may be used to implement a transceiver according to the invention, as long as these architectures provide the three functions of receiver, transmitter and gateway.

Figure 7:
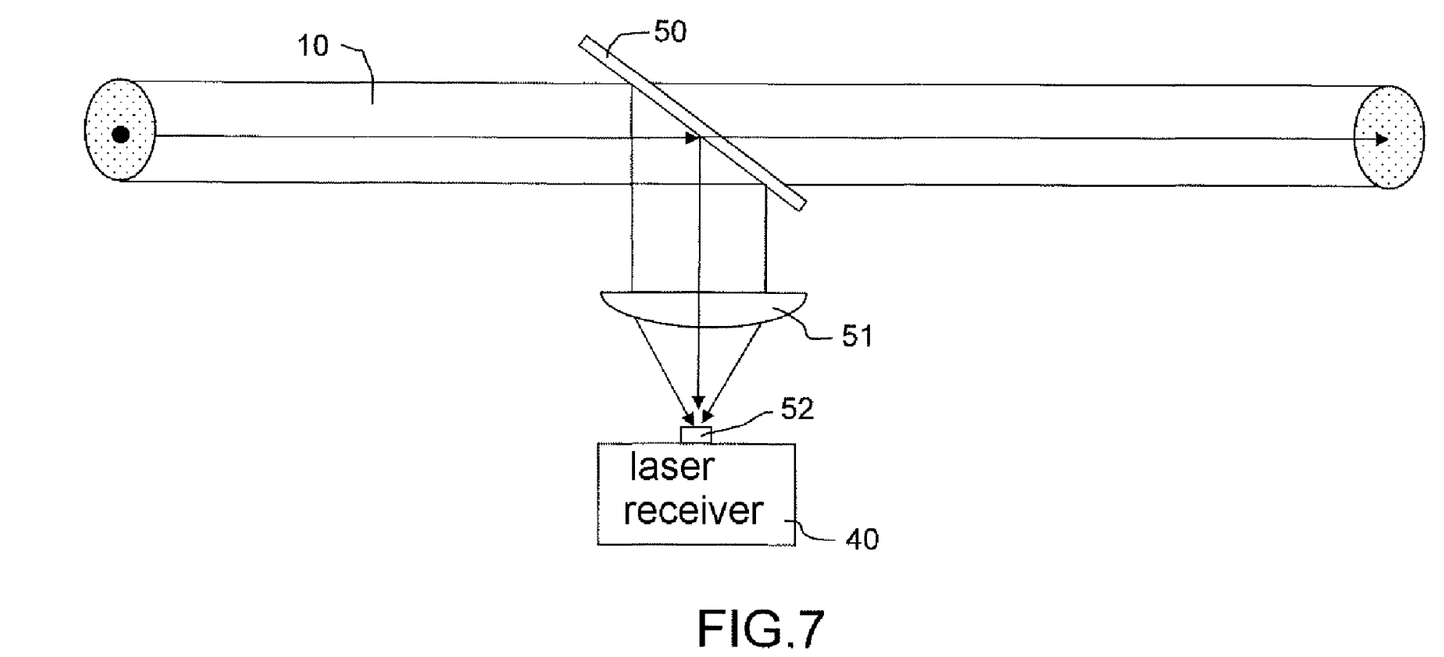
FIG. 7 represents a synoptic illustration of an exemplary embodiment of an optical device according to the invention.

FIG. 7 illustrates an exemplary embodiment of the optical device 35 allowing the beam 10 to be transmitted to the laser receiver 40. For example, the device 35 comprises a semireflecting mirror 50 and a converging lens 51. A part of the beam 10 passes through the mirror 50 without being deflected, the mirror 50 reflecting another part of the beam 10 toward the lens 51. The lens 51 focuses that part of the beam it receives onto a laser sensor 52 of the receiver 40. Notably, the lens 51 allows the often significant vibrations on board an airplane to be factored out, the vibrations causing the angle of incidence of the beam 10 on the mirror 50 to vary. In fact, no matter what the angle of incidence of the beam 10 on the mirror 50, and therefore no matter what the angle of incidence of the deflected beam on the lens 51, the sensor 52 is always effectively illuminated thanks to the lens 51 which concentrates the beam onto its second focal point, where the sensor 52 is found. In the absence of the lens 51, the sensor 52 would not be continuously illuminated, which would lead to significant data losses. The optical device 45 may be implemented in an analogous way.

Figure 8:
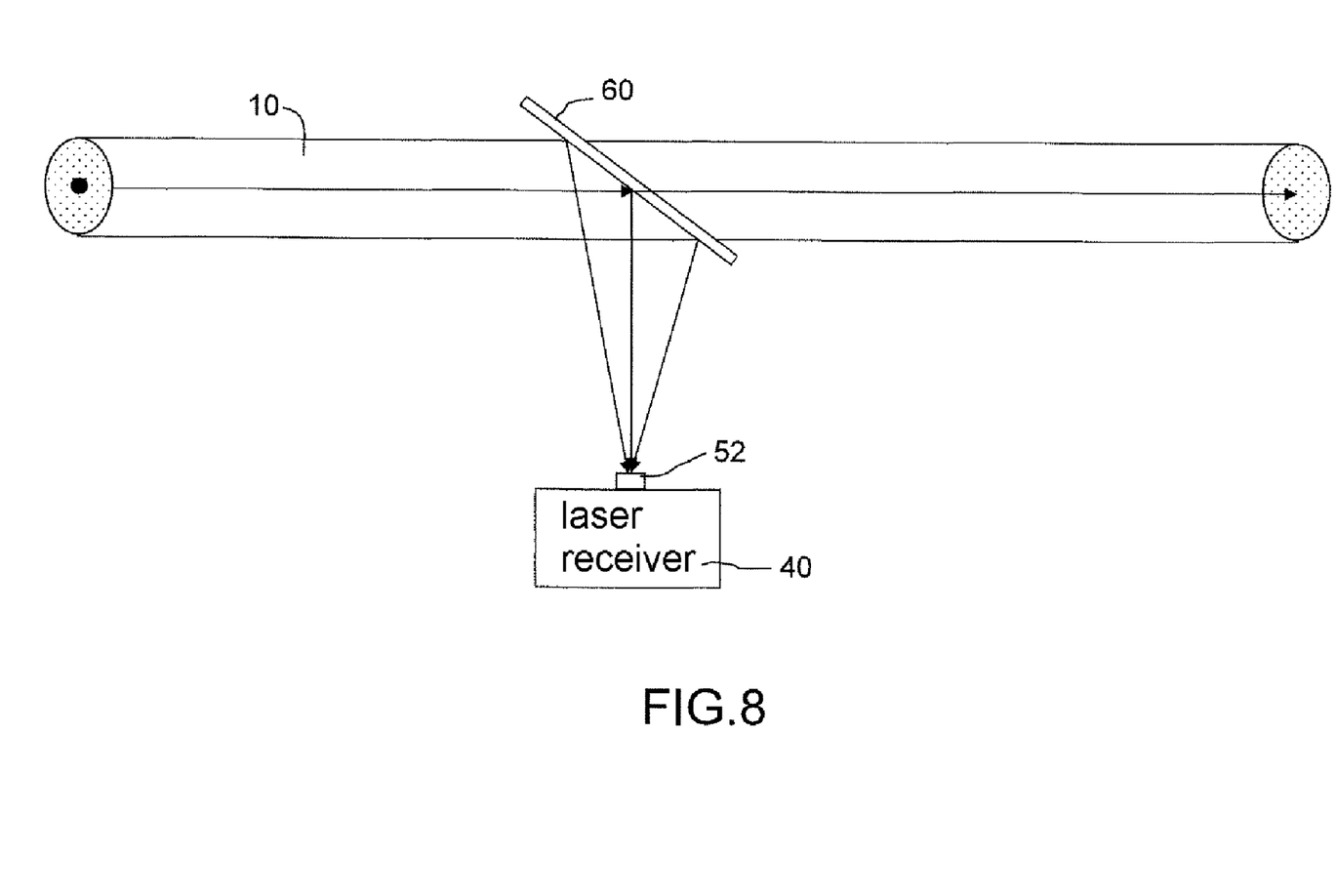
FIG. 8 represents a synoptic illustration of another exemplary embodiment of an optical device according to the invention.

FIG. 8 illustrates another exemplary embodiment of the optical device 35 allowing the beam 10 to be transmitted to the laser receiver 40. For example, the device 35 comprises a semireflecting concave mirror 60 which might be holographic. One part of the beam 10 passes through the mirror 60 without being deflected, the mirror 60 reflecting another part of the beam 10 toward the laser sensor 52 of the receiver 40. The semireflecting concave mirror 60 also allows the vibrations which vary the angle of incidence of the beam 10 on the mirror 60 to be factored out. In fact, no matter what the angle of incidence of the beam 10 on the mirror 60, the sensor 52 is always effectively illuminated thanks to the concave semireflecting mirror 60, which concentrates the beam onto the sensor 52. Indeed the mirror 60 combines the functions of the mirror 50 and of the lens 51 of FIG. 7. The optical device 45 may be implemented in an analogous way.

In the context of an IFE application on board an airplane, the present invention therefore notably dispenses with a backbone cable line that is costly and lacking in flexibility. Being particularly flexible and adaptable, while offering unequalled deployability, the present invention is a solution that further improves the configurability of the passenger cabin. Furthermore, even if it uses the existing technology for free-air data transmission by laser beam, the present invention proposes a use thereof that is unusual and unexpected in more than one way.

On the one hand, it proposes a use of this technology in an environment very busy with people, an environment notoriously poorly suited to the use of a free-air laser beam. On the other hand, it proposes a use of this technology in a vibrating environment that is highly unfavorable to stable laser sighting. It also proposes a use of this technology not only for a simple point-to-point connection, but for a connection that is either unidirectional of the mono-transmitter/multi-receiver type or a duplex connection of the mono-transmitter/multi-modulators/bus architecture type, while still using a single beam thanks notably to its triple function transceiver device.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A data transmission optical device, comprising:
   a source emitting a spot laser beam,
   a diverging lens dispersing the spot laser beam, and
   a parabolic mirror positioned in front of the diverging lens, directly receiving the spot laser beam dispersed by the diverging lens, and collimating the spot laser beam in a single direction to form a laser beam for transmitting a data toward an optical sensor,
   wherein a vertical section through the laser beam has a flattened elliptical surface.

2. The device as claimed in claim 1, wherein the source is configured to emit an infrared laser beam.

3. The device as claimed in claim 1, wherein the sensor is a photoelectric cell.

4. The device as claimed in claim 1, further comprising at least one mirror guiding the collimated beam by reflecting from the source through to the optical sensor.

5. The device as claimed in claim 1 is implementable on board an aircraft.

6. The device as claimed in claim 5, wherein the source is positioned at one end of a passenger cabin of the aircraft and the sensor is associated with a seat in the passenger cabin.

7. The device as claimed in claim 6, wherein the transmitted data is multimedia data.

8. A data transmission optical device, comprising:
   a source emitting a spot laser beam,
   a diverging lens dispersing the spot laser beam, and
   a holographic mirror positioned in front of the diverging lens, directly receiving the spot laser beam dispersed by the diverging lens, and collimating the spot laser beam in a single direction to form a laser beam for transmitting a data toward an optical sensor,
   wherein a vertical section through the laser beam has a flattened elliptical surface.

9. A data transmission optical device, comprising:
   a source emitting a spot laser beam,
   a diverging lens dispersing the spot laser beam, and
   a holographic lens positioned in front of the diverging lens, directly receiving the spot laser beam dispersed by the diverging lens, and collimating the spot laser beam in a single direction to form a laser beam for transmitting a data toward an optical sensor,
   wherein a vertical section through the laser beam has a flattened elliptical surface.

* * * * *